United States Patent [19]

Scott

[11] Patent Number: 4,788,620

[45] Date of Patent: Nov. 29, 1988

[54] STATIC TRIP CIRCUIT BREAKER WITH AUTOMATIC CIRCUIT TRIMMING

[75] Inventor: Graham A. Scott, Avon, Conn.

[73] Assignee: General Electric Company, New York, N.Y.

[21] Appl. No.: 118,574

[22] Filed: Nov. 9, 1987

[51] Int. Cl.$^4$ ............................. H02H 3/093
[52] U.S. Cl. .................... 361/96; 361/97; 361/87; 324/423; 324/130
[58] Field of Search ............ 361/87, 91, 93, 94, 361/95, 96, 97, 98; 364/483, 571; 324/418, 423, 424, 130

[56] References Cited

U.S. PATENT DOCUMENTS

| | | | |
|---|---|---|---|
| 4,016,483 | 4/1977 | Rudin | 323/354 |
| 4,345,288 | 8/1982 | Kompf et al. | 361/94 X |
| 4,494,212 | 1/1985 | Muellner | 364/571 |
| 4,550,360 | 10/1985 | Dougherty | 361/93 |
| 4,589,052 | 5/1986 | Dougherty | 361/94 |
| 4,649,455 | 3/1987 | Scott | 361/93 |
| 4,710,844 | 12/1987 | Scott | 361/96 |

OTHER PUBLICATIONS

Ser. No. 760,224 entitled "Electronic Circuit Breaker Trip Function Adjusting Circuit", Graham Scott et al., filed 7/29/85, now abandoned.

Primary Examiner—A. D. Pellinen
Assistant Examiner—H. L. Williams
Attorney, Agent, or Firm—Richard A. Menelly; Walter C. Bernkopf; Fred Jacob

[57] ABSTRACT

Electronic trip units employed within static trip circuit breakers are individually calibrated and automatically adjusted to ensure that the trip transfer characteristics are within specification requirements. A trimming network within the trip unit circuit contains a plurality of parallel resistors each separately connected within the circuit by means of a fusible link. Test input and output values are compard to idealized values that are binary-weighted within a look-up table in the test equipment computer. The percent correction required is determined and the appropriate links are interrupted to provide ideal trip response.

6 Claims, 3 Drawing Sheets

STATIC TRIP CIRCUIT BREAKER WITH AUTOMATIC CIRCUIT TRIMMING

BACKGROUND OF THE INVENTION

It is standard practice throughout the molded case circuit breaker industry to individually calibrate each thermal magnetic trip unit within such breakers during the manufacturing process. Those breakers failing to meet specified response characteristics are rerouted for additional calibration. The recalibration, often manually performed, interferes with the overall efficiency of circuit breaker manufacture.

Calibration is also required with static trip circuit breakers containing electronic trip circuits. This calibration is undertaken upon computerized test equipment wherein circuit trimming is automatically achieved in response to computerized determinations. The primary sources of errors within electronic trip units are the current transformers and the analog-to-digital conversion circuits. A further source of error lies in the gain set resistors used with operational amplifiers contained within the signal processor network within the trip circuit. Since the transfer characteristics of each trip unit module must meet the specification requirements set by industry standards, some means of adjustment of the gain set resistors must be externally employed without deterring from the automatic assembly of the module during its final stages of assembly.

One example of an electronic trip unit for static trip circuit breakers is found within U.S. Pat. No. 4,589,052, entitled "Digital $I^2T$ Pickup, Time Bands and Timing Control Circuits For Static Trip Circuit Breakers" in the name of John Dougherty. Most of the circuit components are located on an integrated circuit which could also include a digital processor. This Patent is incorporated herein for purposes of reference.

U.S. Pat. No. 4,550,360, entitled "Circuit Breaker Static Trip Unit Having Automatic Circuit Trimming" also in the name of John Dougherty, describes means for trimming those circuits which do include a digital processor.

Additionally, U.S. Pat. No. 4,649,455 entitled "Rating Plug for Molded Case Circuit Breaker" describes a rating plug for electronic circuit breakers wherein the rating of the circuit breaker is adjusted by means of electrical tap connection. U.S. Pat. No. 4,703,389 entitled "Static Trip Circuit Breaker with Automatic Circuit Trimming" describes a trimming network for electronic circuit breakers which includes a plurality of fusible links. Both of the aforementioned U.S. patents are incorporated herein for reference purposes.

One purpose of the instant invention is to provide means for automatic circuit trimming of the gain set resistors to calibrate an electronic trip unit of the type employing a digital logic circuit without a digital processor.

SUMMARY OF THE INVENTION

An electronic trip unit having automatic calibration is provided by a resistive network interconnected by fusible links. A test computer in feed-back connection with the trip unit provides accurate determination as to which of the links must be severed to provide the required response. A removable rating plug allows for adjusting the breaker ampere rating along with selection of overcurrent pickup options.

DESCRIPTION OF THE PREFERRED EMBODIMENT

Figure 1:
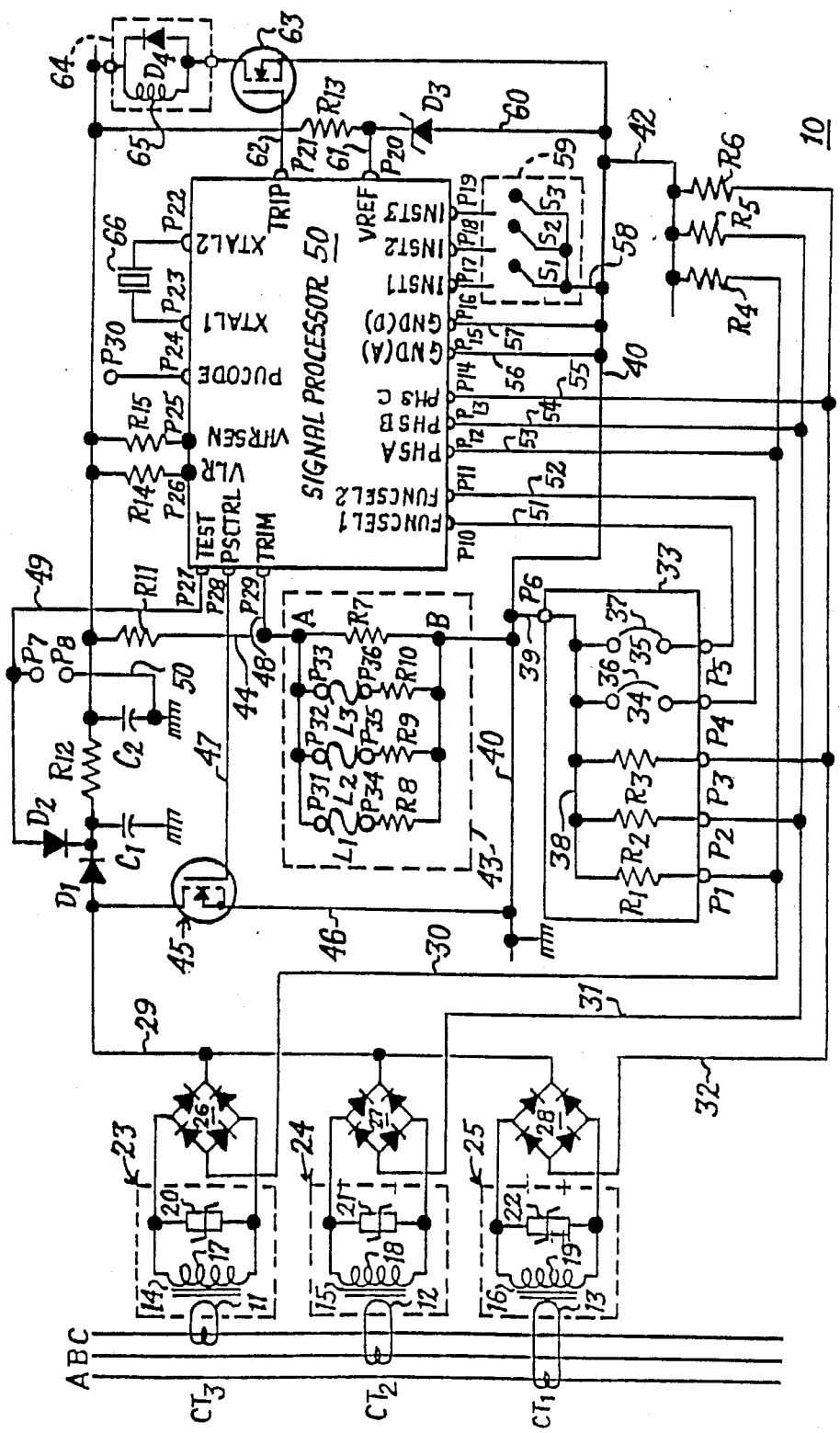
FIG. 1 is a schematic representation of an electronic trip unit circuit employing a trimming circuit according to the invention.

An electronic trip unit is shown in FIG. 1 wherein current sampling transformers 23-25 are arranged on the separate phases A, B, C of a three phase power bus. The current sampling transformers comprise primary windings 11-13, transformer cores 14-16 and secondary windings 17-19. Metal oxide varistors 20-22 are arranged across each of the secondary windings to protect the current transformers against excess voltage surges. Bridge rectifiers 26, 27, 28 are connected between the current transformers and the rating plug 33 by means of three separate conductors 30-32 and a separate conductor 29, which comprises the positive bus. The bridge rectifiers are also connected to pins $P_{12}$-$P_{14}$ on integrated circuit signal processor 50 by means of conductors 53-55 to provide the signal inputs. The input signals are provided to pins $P_1$-$P_3$ on the rating plug for generating representative voltage signals across three burden resistors $R_1$-$R_3$, one for each separate phase, and from there by common connection over conductor 38 to pin $P_6$ which connects with the negative reference bus 40 over conductor 39, as indicated. The rating plug module 33 is removably connected with the trip unit by means of pin connectors $P_1$-$P_6$ so that various resistance values for the burden resistors R1-R3 can be selectively provided to set the circuit breaker ampere rating. Also selectable within the rating plug are the circuit breaker trip options such as long time delay, short time delay, and instantaneous trip by the selective arrangement of the terminals 34, 35 with the connectors 36 and 37. The means of selection of these options will be discussed below in greater detail. It will suffice at this time to appreciate that the rating plug removably connects with the signal processor pins $P_{10}$, $P_{11}$ via conductors 51, 52. Ground connection between the negative bus 40 and the signal processor is made by means of pins $P_{15}$, $P_{16}$ and conductors 56, 57. The instantaneous trip network 59 comprising switches S1-S3 is connected with the negative bus over conductor 58 and with the signal processor by means of pins $P_{17}$-$P_{19}$. Reference voltage is supplied to the signal processor at pin $P_{20}$ which connects to conductor 60 by common connection with the cathode of a band gap reference diode $D_3$ and the reference bias resistor $R_{13}$. The trip output signal from the signal processor is transmitted from pin $P_{21}$ to FET 63, which acts as a non-latching switch to the circuit breaker trip relay 64 which includes relay coil 65 and diode $D_4$. A ceramic resonator 66 connected across pins $P_{22}$, $P_{23}$ provides the clocking reference for the signal processor. The pickup code generated by the signal processor at pin $P_{24}$ is applied to pin $P_{30}$ where it is available to the automated test equipment. The power supply bias resistors $R_{14}$, $R_{15}$ connect between the positive bus and the signal processor at pins $P_{25}$, $P_{26}$ and provide the power supply bias to the signal processor circuit. The power supply voltage to the signal processor is controlled by FET 45, operated as a shunt switching regulator placed across the positive bus 29 and the ground bus 40. Control of the FET 45 gate is provided via connection 47 from pin $P_{28}$ of the signal processing IC 50. Test pins $P_7$, $P_8$ allow for in-situ testing of the signal processor trip response and connect with the test input to the signal processor pin $P_{27}$ over conductor 49 and with the positive bus to diode $D_2$. Diode $D_1$ with filter capacitors $C_1$ and $C_2$ and resistor $R_{12}$ remove undesirable noise frequency from the positive bus prior to connection with the signal processor. Filter capacitors $C_1$ and $C_2$ also provide the energy source for drive coil 65 of the actuator during tripping. The default burden resistors $R_4$–$R_6$ connect back to the bridge rectifiers over conductors 30–32 and with the negative bus over conductor 42 to present the lowest rated resistor value to the signal processor when the rating plug 33, with the higher burden resistors $R_1$–$R_3$ attached, is disconnected from the circuit. The trimming circuit 43 electrically connects with the signal processor over conductor 48 at pin $P_{29}$ and with the positive bus through resistor $R_{11}$ and conductor 44. The purpose of the trimming circuit is to allow for calibration of the signal processor pickup response by selection of the trimming resistors $R_8$–$R_{10}$ electrically connected in parallel with base resistor $R_7$. This is conveniently accomplished by means of selectable fusible links $L_1$–$L_3$ connecting between pins $P_{31}$–$P_{36}$. The precise calibration afforded to the signal processor by the trimming circuit is an important feature of the instant invention. The components of the signal processor 50 are found within the integrated circuit board described within the earlier referenced U.S. Pat. No. 4,589,052 to John Dougherty and referenee should be made for a good description of the specific circuit components therein. The operation of a trimming circuit for selecting the pickup characteristics of a circuit breaker trip unit by the selection of binary-weighted resistors to provide calibration logic to the trip unit circuit is found within an earlier-filed U.S. patent application Ser. No. 760,224, filed July 29, 1985 and entitled "Electronic Circuit Breaker Trip Function Adjusting Circuit"; in the names of Graham Scott et al., now abandoned. Whereas the earlier Application describes the selection of the circuit breaker trip response settings, the instant invention discloses the calibration of the pickup subcircuits contained within the trip unit signal processor circuit.

TABLE I

| BINARY VALUES | RESISTANCE VALUE | % VARIATION |
|---|---|---|
| 1 1 1 | 957 | −4.30 |
| 1 1 0 | 969 | −3.10 |
| 1 0 1 | 980 | −2.00 |
| 1 0 0 | 993 | −0.70 |
| 0 1 1 | 1005 | 0.50 |
| 0 1 0 | 1018 | 1.80 |
| 0 0 1 | 1031 | 3.10 |
| 0 0 0 | 1045 | 4.50 |

Figure 2:
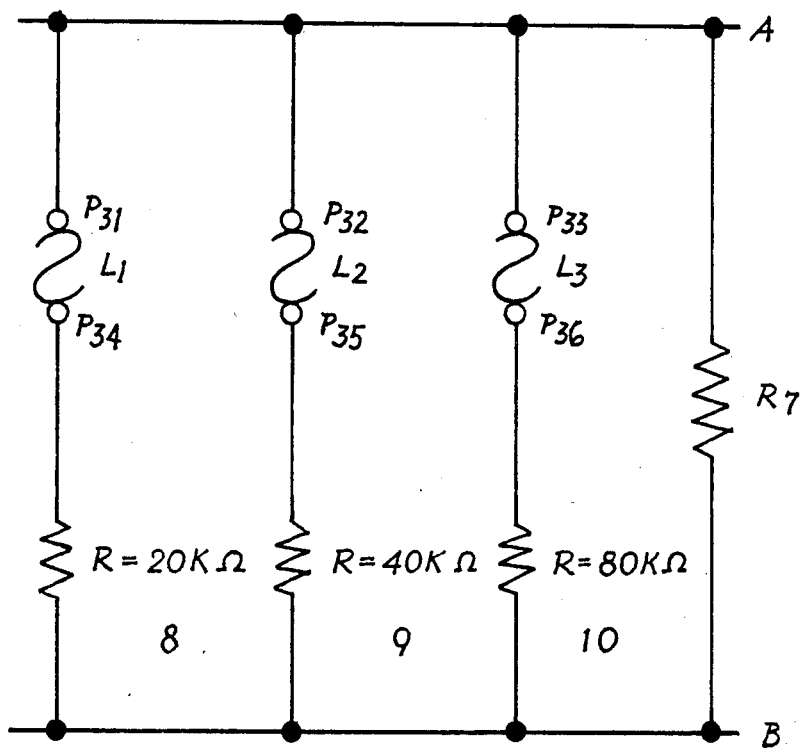
FIG. 2 is a diagrammatic respresentation of the trimming circuit used within the trip unit circuit of FIG. 1.

Referring now to both FIG. 2, which contains an enlarged rendition of the trimming circuit 43 within the trip unit circuit of FIG. 1, and Table I which contains the binary weighted values of the trimming resistors contained within the trimming circuit, the effective calibration for the signal processor pickup signals can be determined. The resultant resistance value as measured between reference points A, B which is inputted to the signal processor circuit in parallel with resistor $R_{11}$, is listed in Table I under "Resistance Value". Each of the trimming resistors $R_8$–$R_{10}$ is assigned a predetermined binary value as indicated and the percent variation from the predetermined value is determined for each resistance value as indicated. The fusible links $L_1$, $L_3$ allow for the insertion or deletion of the binary combination of the trimming resistors by the application of heat to melt the selected combination of links and thereby remove the associated trimming resistors electrically connected in series therewith.

Figure 3:
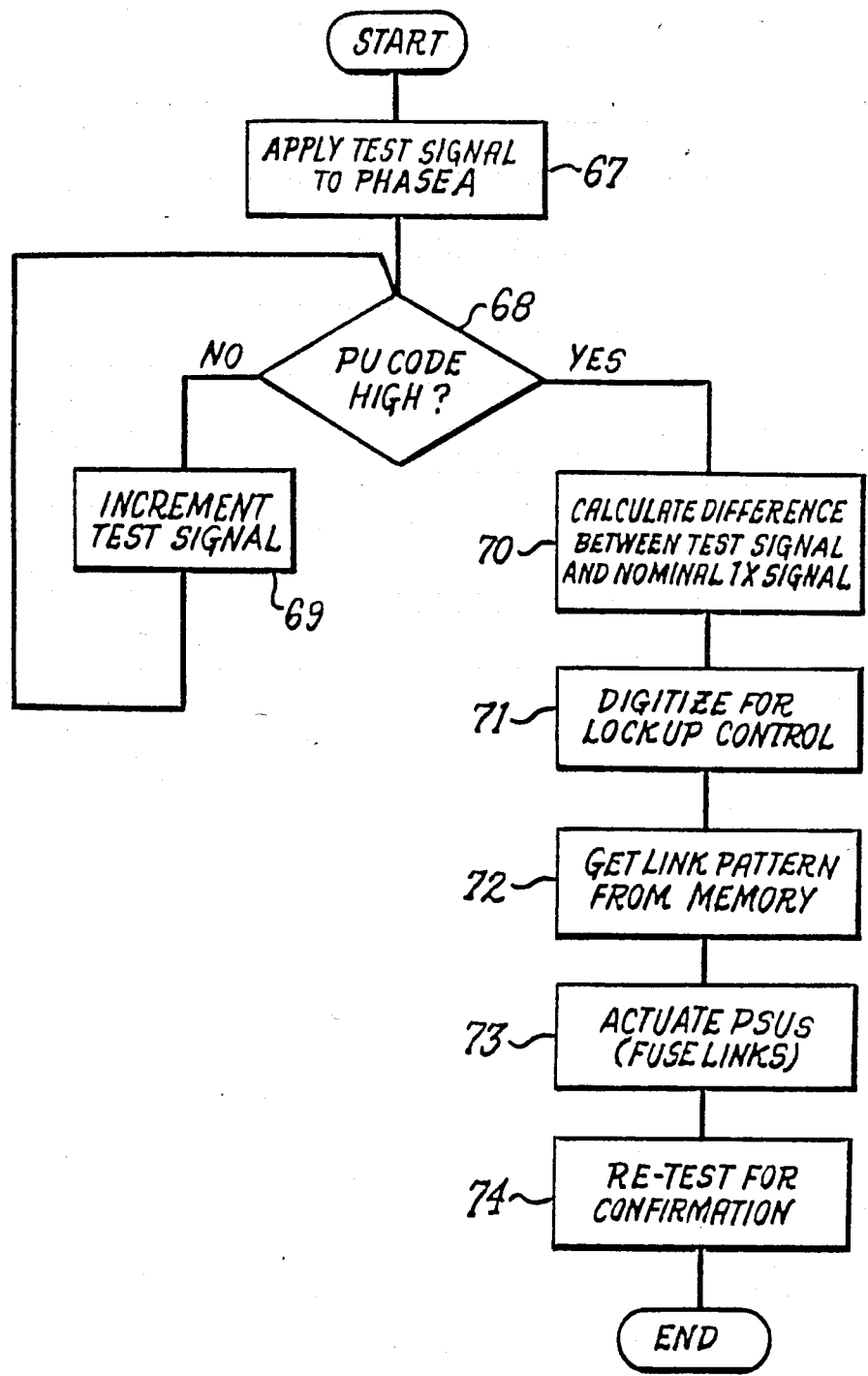
FIG. 3 is a flow chart representation of the process steps used for calibrating the trip unit circuit depicted in FIG. 1.

Once the trip unit circuit 10 has been assembled, as depicted in FIG. 1, and prior to connection with the trip unit current transformers 23–25, a low DC voltage, in the order of 50–60 millivolts is applied to conductor 30 to provide an input to the signal processor at pins $P_{12}$–$P_{14}$. The pickup value (Binary 1 or Binary Ø) is then read at pin $P_{30}$ and a comparison is made to a stored reference value to determine whether the input voltage level applied to pin $P_{30}$ is of a sufficient magnitude to cause the trip unit to enter pickup. The input signal is increased until the level received at pin $P_{30}$ indicates that pickup has been reached. A comparison is made between the input signal at pins $P_{12}$–$P_{14}$ and a nominal 1X pickup value to determine the percent variation of the resistor network from the ideal reference value. On automated assembly equipment, the application of the test signal and analysis of the resultant pickup value is made within a separate computer hereafter "test computer" such as an IBM PC type AT wherein the information listed in Table I is stored in ROM memory as a "look-up" table. Once the determination is made as to the number of links to be removed, a programable controller such as a SIGNA-Series, manufactured by Summation Systems is activated to selectively apply a potential across the selected ones of pins $P_{31}$–$P_{36}$ to melt the links or, alternatively, a high power laser is activated and directed to the specific links to thermally melt the links by high temperature radiation. The calibration program within the test computer is indicated in flow chart format in FIG. 3 and operates as follows. A test signal is applied to phase A (67) and a determination is made as to whether the pickup code went high (68) and, if not, the test signal is incremented by a discrete amount (69). If the pickup code is high, the difference between the test signal and a precalibrated response is determined (70), the difference digitized, a correction obtained from the look-up tables (71) and the appropriate link pattern is obtained (72). An auxiliary power supply unit is then activated and applied to melt the predetermined fusible links (73) and the pickup response is retested for confirmation (74). The confirmation procedure is then repeated for phase B and phase C to confirm that variances between the three phases are within acceptable tolerances.

For the values known in FIG. 2 and with the appropriate resistance values depicted in Table I, the required resistance value across reference points A, B is 1,000 ohms. For a given resistance value for $R_7$, assuming the measured resistance across A, B is found to be 1045 ohms, which represents a 4.50% error. The look-up table shows binary values 0, 1, 1 for a 0.50% minimum error and thereby determines that fusible link $L_1$ should be opened. The test computer auxiliary power supply (not shown) is then activated across pins $P_{31}$, $P_{34}$ and a sufficient voltage is applied to melt fusible link $L_1$ and thereby effectively remove resistance $R_8$ from the trimming network.

TABLE II

| CONNECTORS | OPTIONS |
| --- | --- |
| 36, 37 connected | Longtime delay |
|  | Short time delay |
|  | Instantaneous trip |
| 36 not connected 37 connected | Short time delay Instantaneous trip |
| 36 connected 37 not connected | Instantaneous trip |
| 36, 37 not connected | Trip on power-up |

As described earlier, the rating plug 33 multifunctionally allows resistors $R_1$–$R_3$ to be selected for setting the circuit breaker ampere rating and also allows the various trip options to be selected. Referring to Table II, it is seen that four possible trip options are obtainable by use of only two connectors 36, 37. A user could therefore select any or all of the possible options by removing either one or both of these connectors for the selected trip function option.

It has thus been shown that accurate circuit breaker pickup response can be provided by a calibration routine that involves an adjustable trimming circuit which is rapidly performed upon automated test equipment without added expense. Also disclosed is a removable rating plug capable of providing both trip option selection along with the circuit breaker ampere rating.

Having thus described my invention, what I claim as new and desire to secure by Letters Patent is:

1. A method for calibrating a circuit breaker electronic trip unit comprising the steps of:
   providing a circuit breaker electronic trip unit containing a resistance network arranged as a plurality of trimming resistors electrically in parallel with a base resistor through a corresponding plurality of fusible links;
   applying a test input signal to said trip unit and reading a first pickup level output response;
   comparing said first pickup level output response to a predetermined pickup level and determining a first difference value;
   comparing said first difference value to predetermined binary weighted resistance values to provide a first calibration resistance value; and
   adjusting said resistance network within said trip unit to provide said first calibration resistance value to said trip unit.

2. The method of claim 1 including the steps of:
   re-applying said test input signal to said trip unit and reading a second pickup level output; and
   comparing said second pickup level output to a second predetermined pickup level to determine a second difference value lower than said first difference value.

3. The method of claim 1 wherein said step of adjusting said resistance network comprises:
   melting a predetermined combination of said fusible links to provide said first calibration resistance value.

4. The method of claim 3 wherein said step of melting said fusible links comprises electrical resistance heating.

5. The method of claim 3 wherein said step of melting said fusible links comprises optical laser heating.

6. The method of claim 1 wherein said steps of comparing said first pickup level response and comparing said difference value comprise look-up tables in a digital processor.

* * * * *